(12) United States Patent
Gow et al.

(10) Patent No.: US 11,990,736 B2
(45) Date of Patent: May 21, 2024

(54) FLUSH MOUNTABLE ELECTRICAL APPARATUS

(71) Applicants: Thomas W. Gow, Lake Preston, SD (US); Matthew James Gow, Coon Rapids, MN (US)

(72) Inventors: Thomas W. Gow, Lake Preston, SD (US); Matthew James Gow, Coon Rapids, MN (US)

( * ) Notice: Subject to any disclaimer, the term of this patent is extended or adjusted under 35 U.S.C. 154(b) by 336 days.

(21) Appl. No.: 17/226,411

(22) Filed: Apr. 9, 2021

(65) Prior Publication Data

US 2022/0329056 A1 Oct. 13, 2022

(51) Int. Cl.
| | |
|---|---|
| *H02G 3/00* | (2006.01) |
| *H02G 3/08* | (2006.01) |
| *H02G 3/10* | (2006.01) |
| *H02G 3/12* | (2006.01) |

(52) U.S. Cl.
CPC .............. *H02G 3/12* (2013.01); *H02G 3/083* (2013.01); *H02G 3/086* (2013.01); *H02G 3/10* (2013.01)

(58) Field of Classification Search
CPC .......... H02G 3/12; H02G 3/083; H02G 3/086; H02G 3/10
See application file for complete search history.

(56) References Cited

U.S. PATENT DOCUMENTS

| | | | |
|---|---|---|---|
| 5,025,349 A | 6/1991 | Gow | |
| 5,566,484 A | 10/1996 | Wachter | |
| 5,611,163 A | 3/1997 | Smith | |
| 5,678,336 A | 10/1997 | Jue et al. | |
| 5,685,098 A | 11/1997 | Wegrzyn | |
| 6,093,890 A * | 7/2000 | Gretz | H02G 3/123 |
| | | | 439/535 |
| 6,097,279 A | 8/2000 | Gow | |
| 6,166,329 A * | 12/2000 | Oliver | H02G 3/14 |
| | | | 174/67 |
| 6,367,179 B1 | 4/2002 | Marsh | |
| 6,430,853 B1 | 8/2002 | Choi | |
| 6,763,624 B2 | 7/2004 | Gow | |
| 7,314,094 B2 | 1/2008 | Gow et al. | |
| 7,319,192 B1 * | 1/2008 | Gretz | H02G 3/123 |
| | | | 174/53 |
| 8,217,264 B2 * | 7/2012 | Gow | H02G 3/123 |
| | | | 174/67 |
| 8,469,556 B2 | 6/2013 | Gow | |
| 8,471,407 B2 | 6/2013 | Gow et al. | |
| 9,990,868 B1 | 6/2018 | Katz et al. | |
| 10,083,637 B1 | 9/2018 | Gardner | |
| 10,855,066 B2 * | 12/2020 | Elliott | H01R 13/512 |

(Continued)

*Primary Examiner* — Pete T Lee

(57) ABSTRACT

A flush mountable electrical apparatus, according to an example, includes an electrical apparatus including a junction box having an open end, an electrical device positioned within the junction box, and a first cover plate to cover the open end of the junction box. The flush mountable electrical apparatus further includes a second cover plate attached to the first cover plate, and a mounting plate to be mounted over a recess in a mounting surface. The mounting plate includes a first opening sized to allow the electrical apparatus to be inserted through the first opening and into the recess. The second cover plate is configured to be attached to the mounting plate to secure the electrical apparatus in position within the recess.

20 Claims, 13 Drawing Sheets

(56) References Cited

U.S. PATENT DOCUMENTS

| | | | |
|---|---|---|---|
| 2007/0194180 A1* | 8/2007 | Korcz | H02G 3/123 |
| | | | 248/56 |
| 2010/0263184 A1 | 10/2010 | Ray et al. | |
| 2012/0174448 A1 | 7/2012 | Lee | |
| 2012/0176776 A1 | 7/2012 | Van Herpen et al. | |
| 2014/0179157 A1* | 6/2014 | Gonzalez | H02G 3/14 |
| | | | 439/535 |
| 2016/0260363 A1 | 9/2016 | Hall | |

* cited by examiner

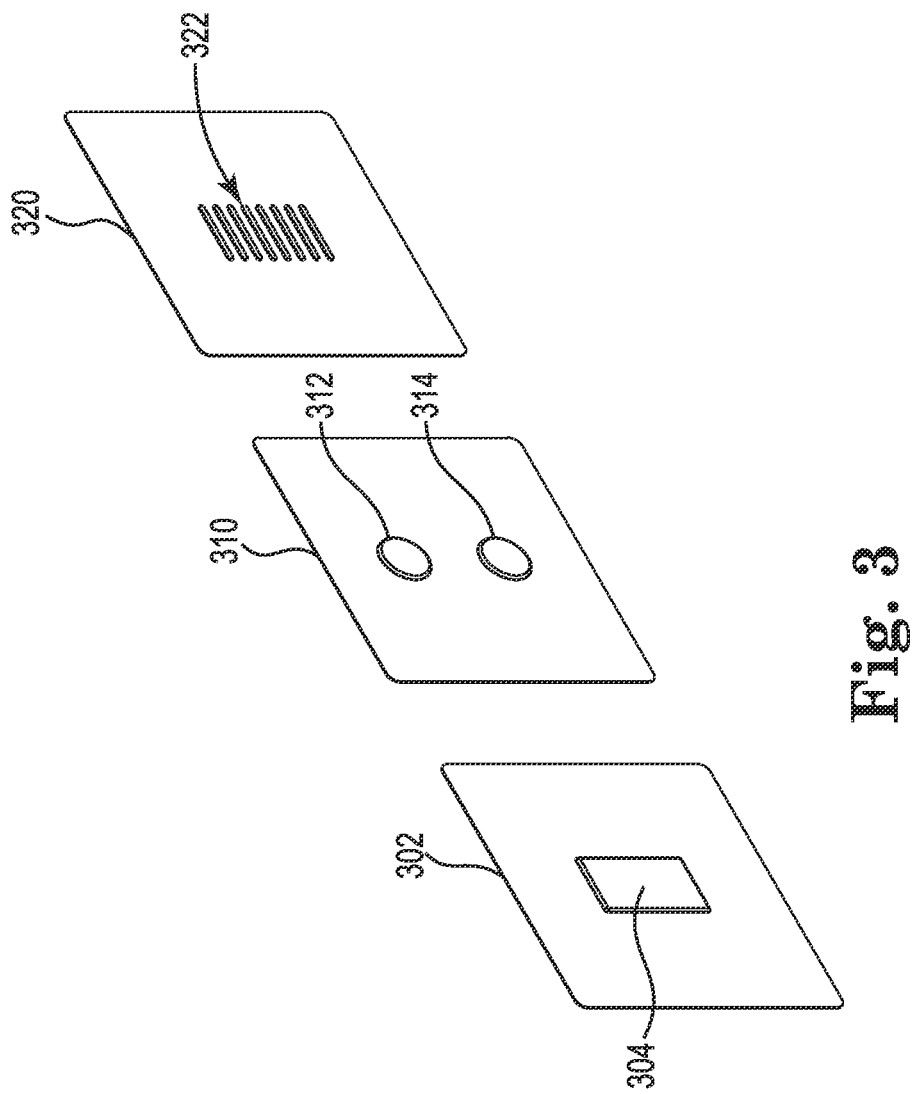

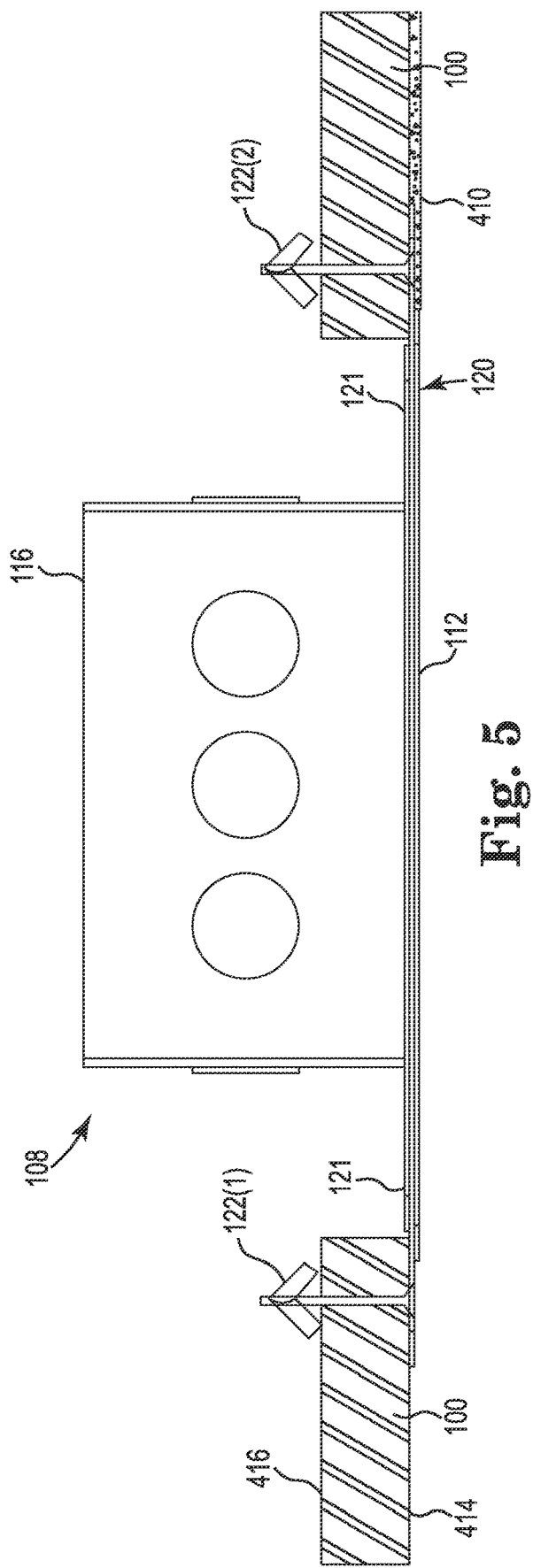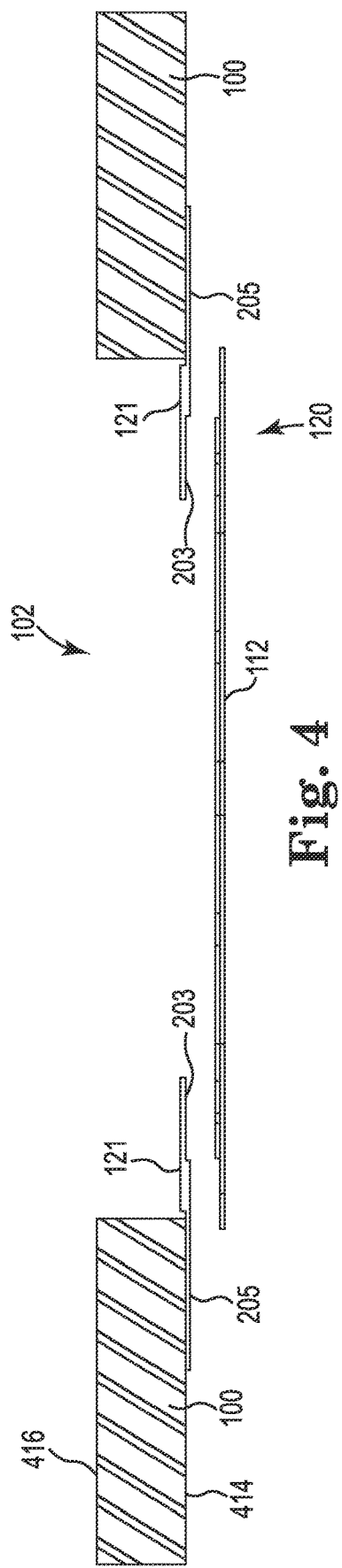

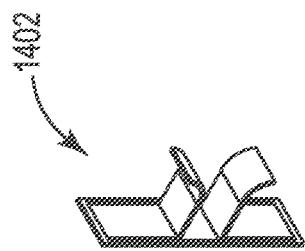
Fig. 14
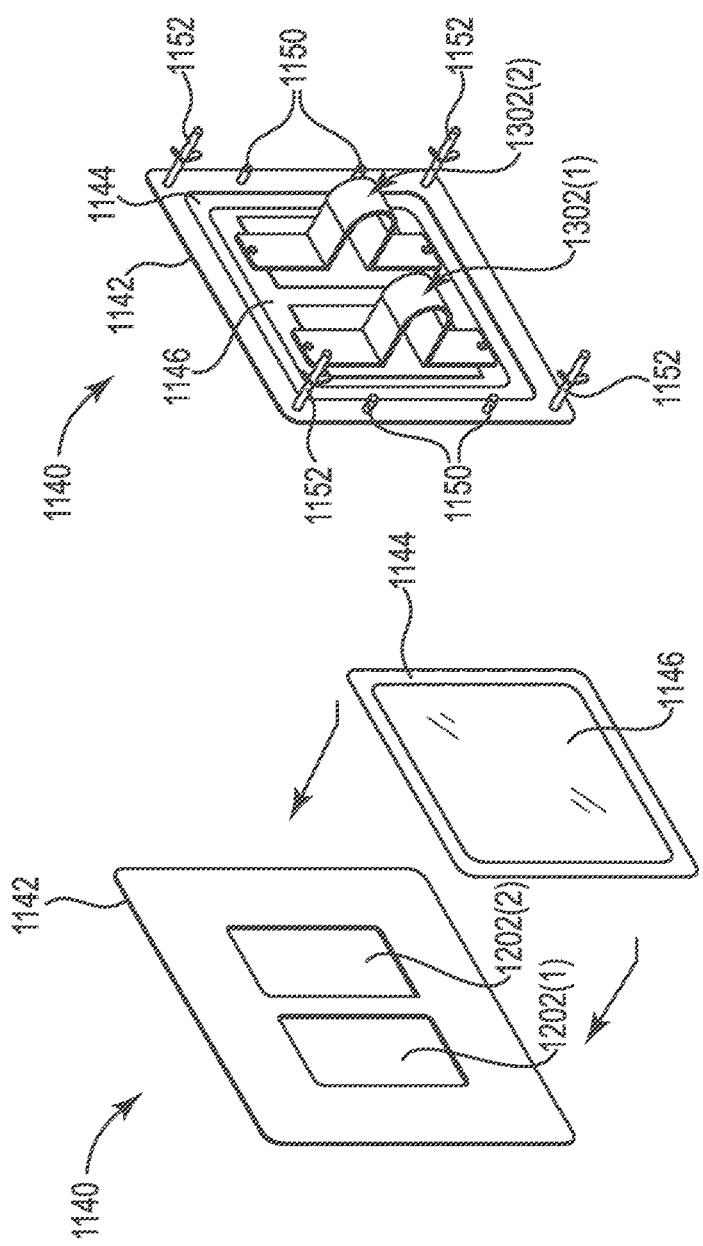
Fig. 13
Fig. 12

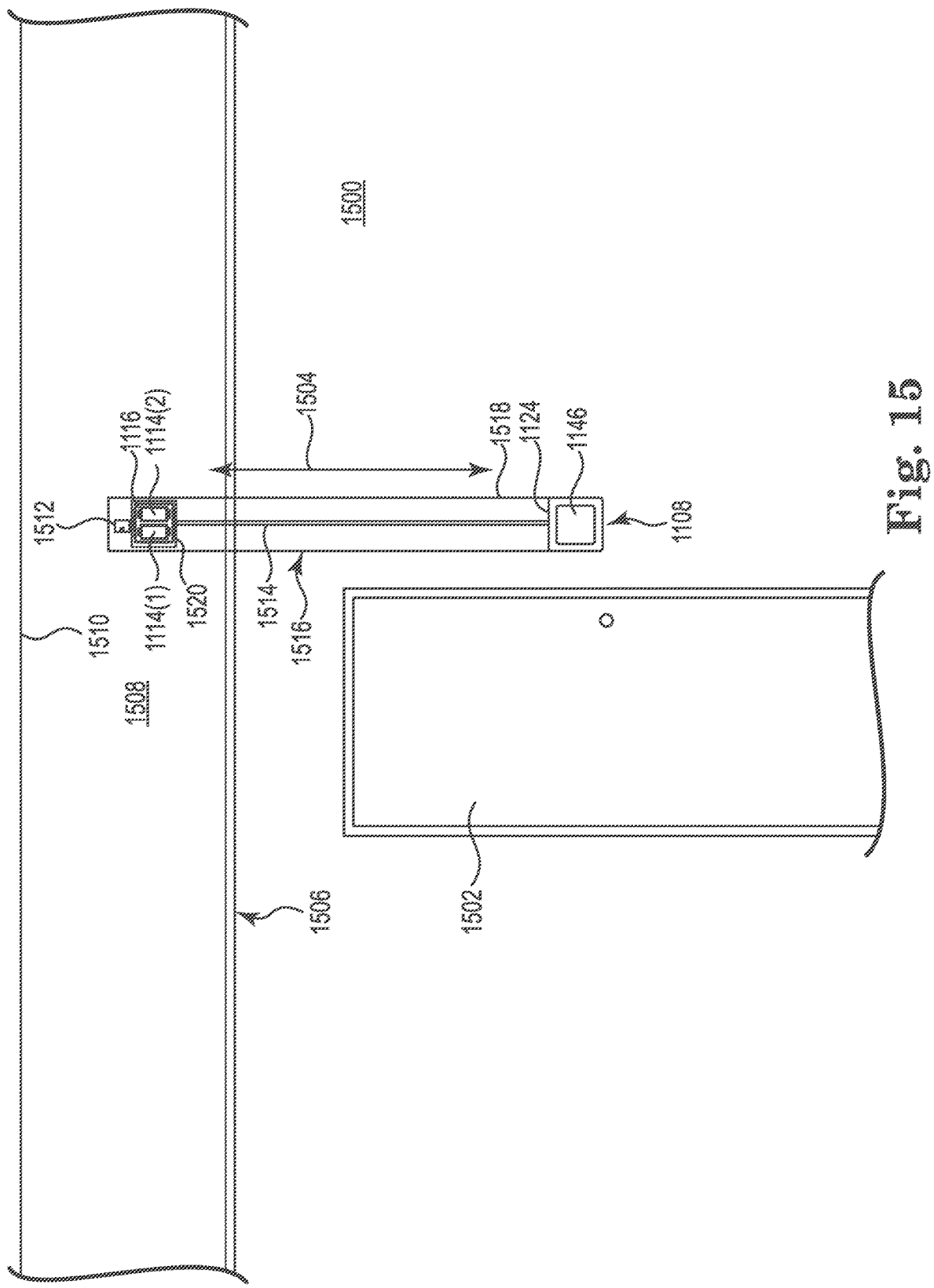

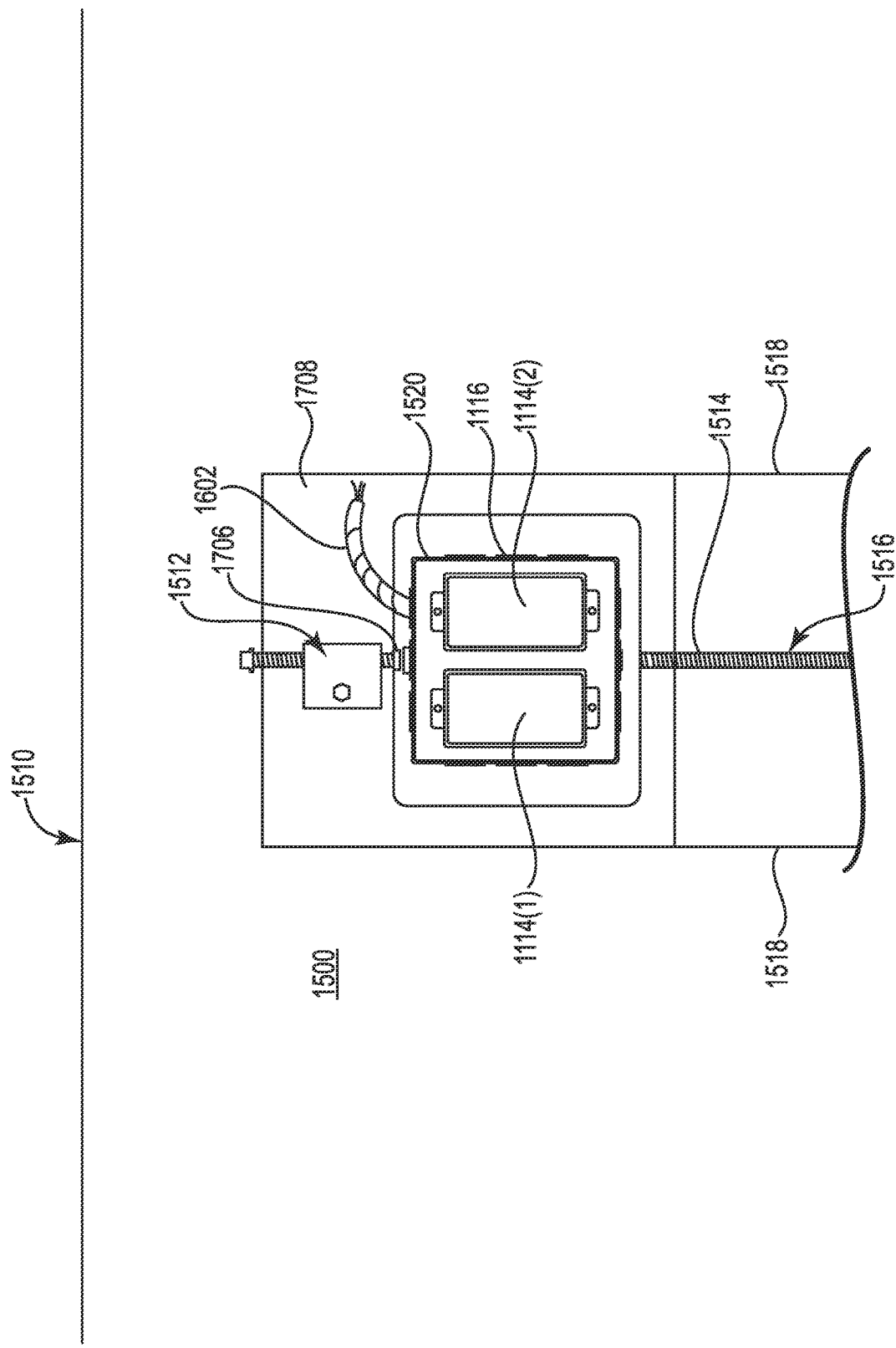

FLUSH MOUNTABLE ELECTRICAL APPARATUS

BACKGROUND

An electrical apparatus for a building may include a junction box, an electrical device, and a code required cover plate. Existing electrical apparatuses for buildings are typically mounted in some exposed location and may be subject to accidental damage, intentional vandalism, collection of dirt and grime, and in many cases are not aesthetically pleasing to look at. Because of their general exposure, electrical apparatuses may be vulnerable to breakage of, or tampering with, the apparatus itself, with possible resultant disconnecting of the apparatus from a power source. Additionally, many electrical apparatuses do not have an aesthetically pleasing appearance. Such electrical apparatuses may only be available in a very limited selection of colors (e.g., white, ivory, brown, wood, and silver metallic finishes) . The limited color selections may conflict with the many possible room paint colors, wallpapers, textures, metal, and wood grain wall and ceiling finishes. When thousands of dollars have been spent to establish a pleasing decor in an office, lobby, etc., the appearance of such an apparatus can be glaringly out of place.

For these and other reasons, a need exists for the present invention.

SUMMARY

One example is directed to a flush mountable electrical apparatus, which includes an electrical apparatus including a junction box having an open end, an electrical device positioned within the junction box, and a first cover plate to cover the open end of the junction box. The flush mountable electrical apparatus further includes a second cover plate attached to the first cover plate, and a mounting plate to be mounted over a recess in a mounting surface. The mounting plate includes a first opening sized to allow the electrical apparatus to be inserted through the first opening and into the recess. The second cover plate is configured to be attached to the mounting plate to secure the electrical apparatus in position within the recess.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 is a diagram illustrating additional example configurations of the cover plate shown in FIGS. 1 and 2.

FIG. 4 is a diagram illustrating a cross-sectional view of a wall and the flush mounting system shown in FIG. 1 according to an example.

FIG. 5 is a diagram illustrating a cross-sectional view of a wall and the flush mountable electrical apparatus mounted to the wall according to an example.

FIG. 12 is an assembly diagram illustrating elements of the flush front panel shown in FIG. 11 according to an example.

FIG. 13 is a diagram illustrating a back side of the flush front panel shown in FIGS. 11 and 12 according to an example.

FIG. 14 is a diagram illustrating a spring steel switch transfer bar according to another example.

FIG. 15 is a diagram illustrating a front view of a transport mechanism for the flush mountable electrical apparatus shown in FIG. 11 according to an example.

FIG. 17 is a diagram illustrating a front view of the transport mechanism and the electrical apparatus shown in FIG. 15 according to another example.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Examples disclosed herein are directed to an aesthetically-pleasing, easy-to-install, vandal-resistant, concealed, flush mountable electrical apparatus. The electrical apparatus may include at least one electrical device and a cover plate. Examples of the flush mountable electrical apparatus may be used in new construction, and may also be readily used in remodeling or in retrofit circumstances to provide an aesthetically pleasing electrical apparatus that can be mounted flush and concealed in a wall. Examples of the flush mountable electrical apparatus improve the building room architectural aesthetics eliminating the code requirement of exposed cover plates.

Figure 1:
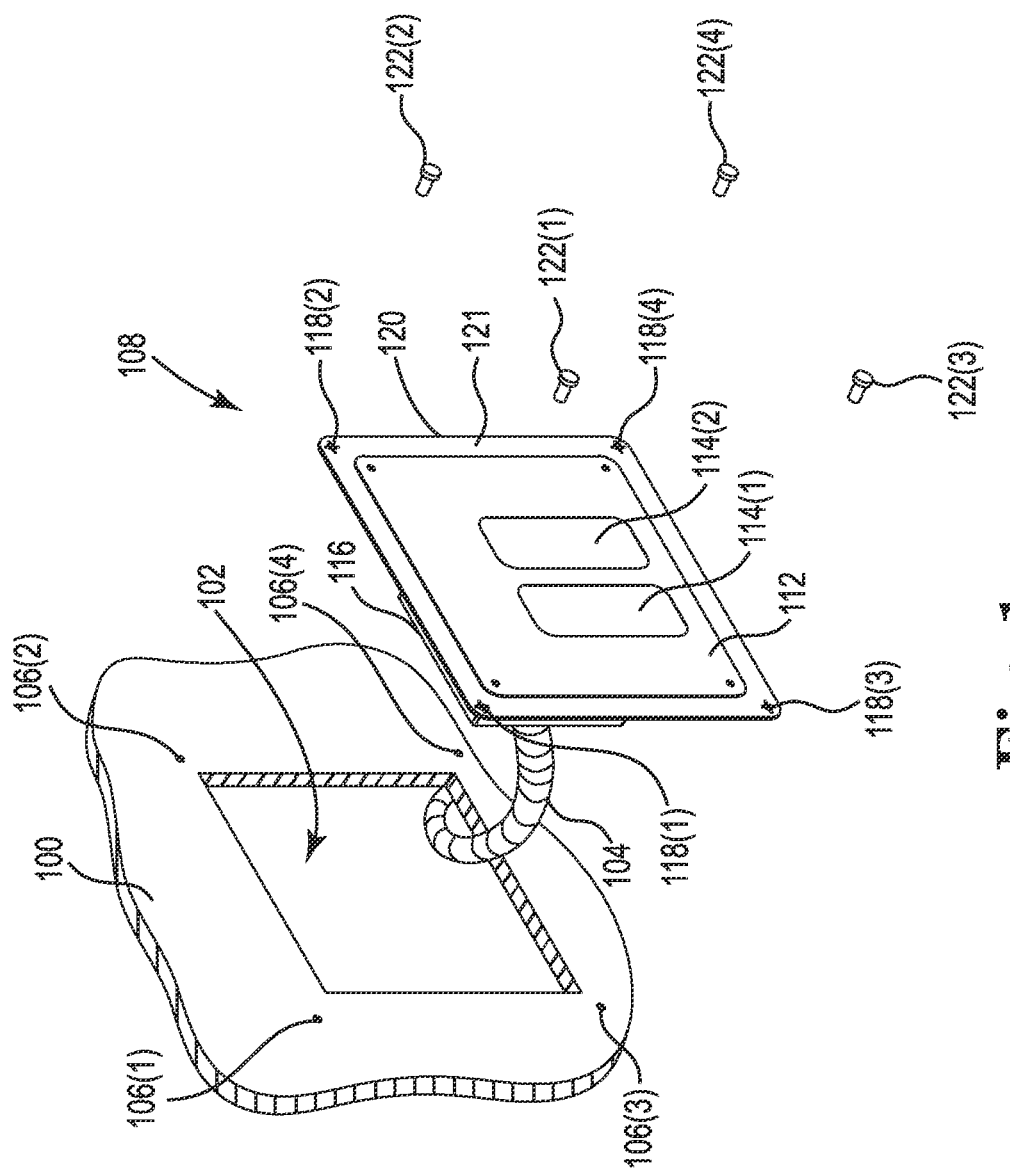
FIG. 1 is a diagram illustrating a flush mountable electrical apparatus configured to be flush mounted to a wall according to an example.

FIG. 1 is a diagram illustrating a flush mountable electrical apparatus 108 configured to be flush mounted to a wall 100 according to an example. Flush mountable electrical apparatus 108 includes electrical apparatus 116 and flush mounting system 120. The electrical apparatus 116 extends outward from a rear surface of the flush mounting system 120 and is connected to power cable 104. Power cable 104 provides power from an external source (e.g., the building mains) to at least one electrical device within the electrical apparatus 116. The electrical apparatus 116 may include an emergency power supply to provide power when power is lost to the building mains.

The electrical apparatus 116 includes at least one electrical device. In the illustrated example, the electrical apparatus 116 includes two electrical devices 114(1) and 114(2) (collectively referred to herein as electrical devices 114). The electrical devices 114 may include, for example, control switches, timers, infra-red or ultrasonic occupancy or vacancy sensors, electrical power receptacles, thermostats, security motion sensors, fire alarm heat and smoke detectors, fire alarm audio and/or visual indication devices (e.g., speakers, bells, horns, and strobes), building security card access terminals, communication cable terminal connectors, Wi-Fi signaling transmitters/receivers, elevator cab call push buttons, audio/visual signaling, position indicator lights, as well as other electrical devices. Such devices, when used in building construction, are commonly exposed on wall and ceiling mounted installations. For examples in which the electrical devices 114 are electrical switches, such as wall mounted electrical switches that control lighting and/or power equipment, the electrical switches may be toggle type switches, capacitance switches, resistive switches, proximity switches, infrared switches, and laser beam switches.

Common building construction uses wallboard (also referred to as drywall or gypsum board) or other types of panels mounted on studs for the walls, or on joists for ceilings to define individual occupancy spaces (e.g., rooms, halls, etc.). The spaces between the studs or joists behind the panels are usually void or occupied by insulation. In commercial buildings and multiple dwellings, some ceilings use panels that fit into metal frames suspended from I-beams or poured concrete layers. For the sake of simplicity, all of these various types of room-defining panels having voids behind them will hereafter be referred to as "walls".

Flush mountable electrical apparatus 108 is configured to be installed in wall 100. Flush mounting system 120 includes mounting system cover plate 112 and mounting plate 121. Cover plate 112 may be attached to a front surface of the electrical apparatus 116. The electrical apparatus 116 may then be inserted through an opening in the mounting plate 121 to allow the cover plate 112 to be attached to the mounting plate 121. Wall 100 includes a rectangular-shaped opening or recess 102, which is sized to receive electrical apparatus 116 therein. Wall 100 also includes four holes 106(1)-106(4) formed therein around a perimeter of the opening 102. Mounting plate 121 includes four holes 118(1)-118(4) formed therein near the four corners of the plate 121. Attachment structures 122(1)-122(4) (e.g., pins, screws, bolts, or other attachment structures) are configured to be inserted into respective holes 118(1)-118(4) and respective holes 106(1)-106(4) to help maintain the installed positioned of the flush mountable electrical apparatus 108.

After installation, the front surface of the flush mountable electrical apparatus 108 is flush or nearly flush with the outer finished surface of the wall 100. After installation, the electrical apparatus 116 is positioned completely behind the outer surface of the wall 100, and the flush mounting system 120 is the only external part of the installed apparatus 108. After installation, the electrical apparatus 116 is concealed behind the flush-mounted cover plate 112, which may be "in-the-field" painted to match each particular room's wall and ceiling finishes.

Flush mountable electrical apparatus 108 may be mounted into any of many wall materials. In addition to gypsum board, other wall materials where the apparatus 108 may be installed include brick and mortar, wood, concrete, fiberglass, and metal construction. Matching wall finishes may be applied to the wall and the flush mounting system 120, including paint and wall paper fabric coverage. The front surface of the apparatus 108 may include a textured finished surface to match any other finished wall materials.

After mounting the flush mountable electrical apparatus 108 onto the wall 100, standard mudding of plaster compound and fiberglass taping may be applied overlapping the perimeter edges of the flush mounting system 120 and the wall surface. This allows the apparatus 108 to be concealed on the same plane as the finished wall surface. A surface coverage, such as paint, may be applied across both the perimeter of the front surface of the flush mounting system 120 and the surrounding wall area at the same time. The cover plate 112 and the mounting plate 121 allow the application thereon of the same matching overall wall finished colors to blend these plates 112 and 121 into each unique room finished wall or ceiling appearance. After installation, the flush mountable electrical apparatus 108 has an aesthetically pleasing appearance in regard to the desire of architects and interior designers because it is substantially concealed and blends in with the surrounding wall surface. The flush mountable electrical apparatus 108 has the ability to provide the best appearance regardless of the particular wall construction materials and textures, including gypsum board, wood, concrete block, brick, stone, marble, and others.

The cover plate 112 may also be manufactured with any appearance and texture, to match exactly a wall or ceiling finished material appearance with the use of a laser printed paint application. Laser printing applications include replicating any paint color selection, typically specified under RAL, Pantone or similar color number matching charts. The laser printed flush cover plates can also replicate the exact surrounding wall materials and textures and match wood grain, marble lines and metallic finishes, brick, concrete, and concrete block. Textured metal or silicone mold versions of the cover plate 112 may be made to match the surrounding wall material finishes. The flush cover plate 112 can be manufactured as a translucent panel with internally illuminated back lighted switches to indicate on/off positions and also feature illuminated custom logos/patterns.

Previous exposed electrical apparatuses in buildings could experience very high ongoing replacement costs to building owners. Exposed electrical apparatuses are typically an easy target for vandalism since the enclosures are noticeably visible and may be constructed with component parts that suffer damage easily. Damaged electrical apparatuses can also cause added liability and safety concerns. In contrast, examples of the flush mountable electrical apparatus 108 conceal electrical devices and their associated cover plates and provide reduced liability concerns and an improvement in regard to vandalism with the concealed enclosure. This design reduces possible damage from vandalism since there is no visible exposed enclosure or constructed parts to attract undesirable attention.

Figure 2:
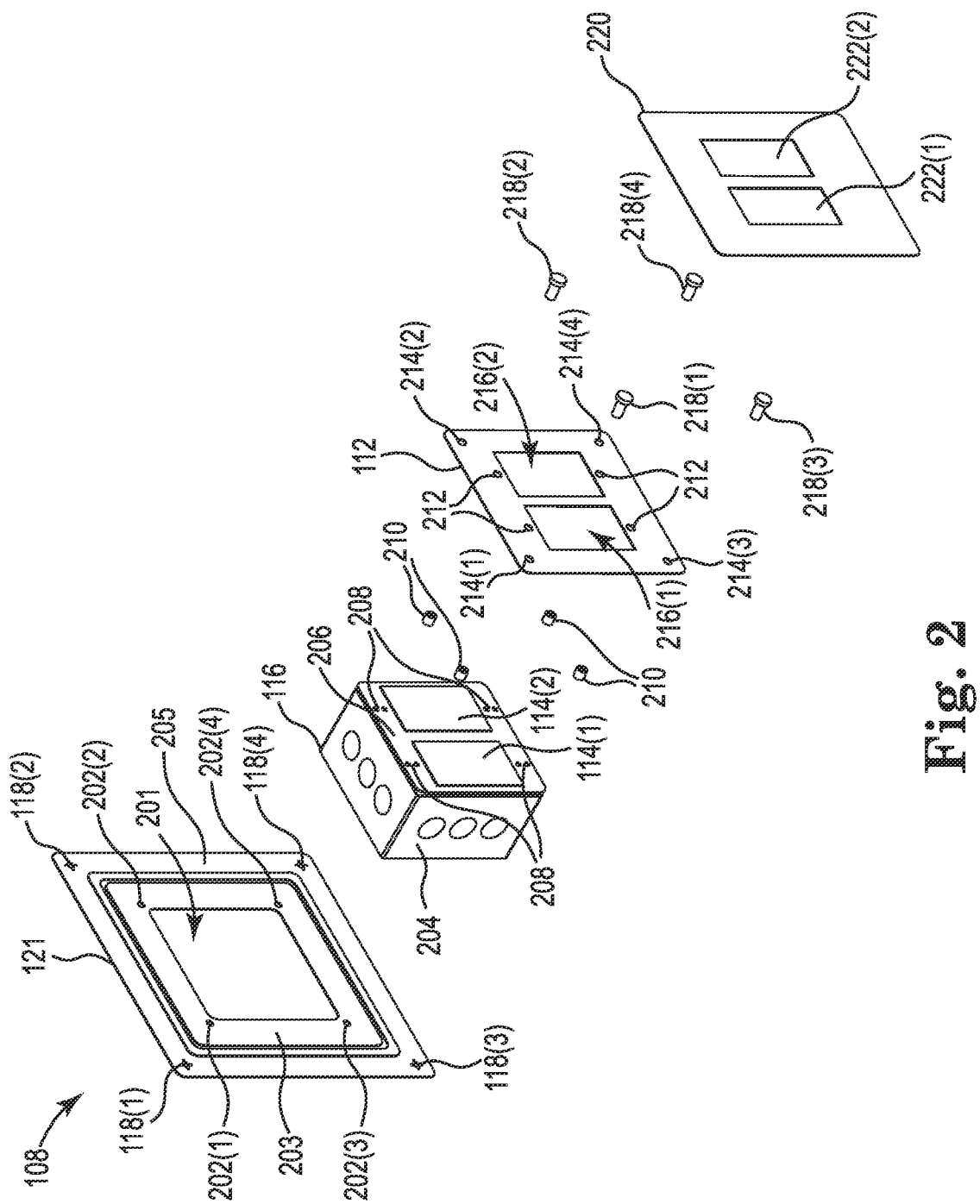
FIG. 2 is an assembly diagram illustrating elements of the flush mountable electrical apparatus shown in FIG. 1 according to an example.

FIG. 2 is an assembly diagram illustrating elements of the flush mountable electrical apparatus 108 shown in FIG. 1 according to an example. As shown in FIG. 2, the electrical apparatus 116 includes a junction box 204, electrical devices 114(1) and 114(2), and a device cover plate 206. The junction box 204 includes an open end to receive the electrical devices 114(1) and 114(2). After the electrical devices 114(1) and 114(2) are positioned within the junction box 204, the device cover plate 206 is attached to the junction box 204 to cover the open end of the junction box 204. In the illustrated example, the device cover plate 206 includes two openings that respectively allow the two electrical devices 114(1) and 114(2) to extend at least partially there through.

After the electrical apparatus 116 is constructed, cover plate 112 of the flush mounting system 120 may be attached over the front of the device cover plate 206 of the electrical apparatus 116. The cover plate 112 is placed over the front of the device cover plate 206 with holes 212 formed in cover plate 112 respectively aligned with holes 208 formed in the device cover plate 206. Attachment structures (e.g., pins, screws, bolts, or other attachment structures) may then be inserted through holes 212, through spacers 210, and into holes 208 to attach the cover plate 112 to the device cover plate 206. The spacers 210 maintain a separation between the cover plate 112 and the device cover plate 206. Cover plate 112 includes openings 216(1) and 216(2) that are respectively aligned with the two holes formed in the device cover plate 206 to provide access to the electrical devices 114(1) and 114(2).

The electrical apparatus 116 with the cover plate 112 attached thereto may then be attached to the mounting plate 121. Mounting plate 121 includes a rectangular-shaped opening 201, an inner region 203 directly adjacent to and surrounding the opening 201, and an outer region 205 directly adjacent to and surrounding the inner region 203. The electrical apparatus 116 has a smaller size than the opening 201 formed in the mounting plate 121, which allows the electrical apparatus 116 to be inserted through the opening 201 and be positioned on a back side of the mounting plate 121. The cover plate 112 is larger than the electrical apparatus 116 and the opening 201, but smaller than the mounting plate 121. The cover plate 112 rests against the front side of the mounting plate 121 along a perimeter of the opening 201 when the electrical apparatus 116 has been inserted completely through the opening 201. Holes 214(1)-214(4) formed in the cover plate 112 are respectively aligned with holes 202(1)-202(4) formed in the inner region 203 of the mounting plate 121. Attachment structures 218(1)-218(4) (e.g., pins, screws, bolts, or other attachment structures) may be inserted through holes 214(1)-214(4), respectively, and into holes 202(1)-202(4), respectively, to secure the electrical apparatus 116 and the cover plate 112 to the mounting plate 121. At this point, the assembled apparatus may then be mounted to a wall as shown in FIG. 1, and described above. The mounting plate 121 may also be attached to the wall prior to the electrical apparatus 116 and the cover plate 112 being attached to the mounting plate 121 (see, e.g., FIGS. 4 and 5 and corresponding description).

In some examples, a flexible cover plate 220 may be attached over cover plate 112. The flexible cover plate 220 may include user-interaction regions 222(1)-222(2) (collectively referred to as user-interaction regions 222). The user-interaction regions 222(1) and 222(2) are aligned with and correspond in size to the openings 216(1) and 216(2), respectively, of the cover plate 112, and are aligned with the electrical devices 114(1) and 114(2), respectively. A user may push on the user-interaction regions 222(1) and 222(2), causing the flexible material to extend into the openings 216(1) and 216(2), respectively, and contact the electrical devices 114(1) and 114(2). In this manner, a user may activate or deactivate one or both of the electrical devices 114(1) and 114(2). For example, if electrical devices 114(1) and 114(2) are building system control on/off switches concealed behind the flexible cover plate 220, a user may depress the user-interaction regions 222(1) and 222(2) to apply pressure to the on/off switches and energize and de-energize building power circuits. The electrical devices 114(1) and 114(2) may also be other types of devices, such as dimmers, occupancy sensors, vacancy sensors, elevator cab push buttons, elevator cab audio/visual floor indicators, as well as others. For some types of electrical devices, such as some capacitance switches, resistive switches, proximity switches, infrared switches, and laser beam switches, actual physical contact with the flexible cover plate 220 (or other cover plate if flexible cover plate 220 is not used) by a user to cause physical movement of the flexible material may not be required to control the electrical devices. Rather, for such electrical devices, a user may be able to control the electrical devices by, for example, simply making contact with the flexible cover plate 220, or moving the user's hand in proximity to the flexible cover plate 220 to be sensed by a switch sensor.

Flexible cover plate 220 may be removable to allow access to electrical devices 114(1) and 114(2) and other items in electrical apparatus 116 through openings 216(1) and 216(2) in cover plate 112. This allows access to, for example, power and communication connections, timers, infra-red/ultrasonic occupancy/vacancy line-of-sight sensors, security motion line-of-sight sensors, thermostats, smoke and heat fire alarm detectors, and fire alarm indicators and elevator cab call position indicator lights.

Examples of the flush mountable electrical apparatus 108 disclosed herein provide improved hygiene and reduce the possible spread of contaminates and disease in medical facilities, private areas, and public areas. The flush cover plate provides a smooth and reduced area that is more easily cleaned and disinfected as compared to common raised surfaces of multiple stepped shaped components of exposed electrical devices and cover plates that inhibit thorough cleaning. The flush cover plate may be manufactured with anti-microbial coatings to further inhibit health concerns. Any number of electrical devices 114 can be ganged together in one flush mountable electrical apparatus 108, which offers unlimited combinations of multiple devices in any configuration and row quantities.

FIG. 3 is a diagram illustrating additional example configurations of the cover plate 112 shown in FIGS. 1 and 2. The size and configuration of the cover plate 112 may vary based on, for example, the number, size, and type of the electrical devices 114 in the electrical apparatus 116. As an example, the electrical apparatus 116 may include a single electrical device 114, such as an electrical switch or an elevator audio/visual lobby cab floor indicator, and a cover plate 302 with a single rectangular shaped opening 304 may be used. As another example, the electrical apparatus 116 may include two electrical devices 114, such as two elevator cab call push buttons, and a cover plate 310 with two circular shaped openings 312 and 314 may be used to provide access to the push buttons. As another example, the electrical apparatus 116 may include one or more sensors as the electrical devices 114, and a cover plate 320 with an array of slits 322 formed therein may be used for such electrical devices.

FIG. 4 is a diagram illustrating a cross-sectional view of the wall 100 and the flush mounting system 120 shown in FIG. 1 according to an example. FIG. is a diagram illustrating a cross-sectional view of the wall 100 and the flush mountable electrical apparatus 108 mounted to the wall 100 according to an example. Wall 100 includes a rectangular-shaped opening 102, which is sized to receive electrical apparatus 116 therein. The flush mounting system 120 includes the mounting plate 121 and the cover plate 112. As shown in FIG. 4, the back side of the outer region 205 of the mounting plate 121 is attached to a front side 414 of the wall 100. The back side of the wall 100 is represented by reference number 416. The inner region 203 of the mounting plate 121 extends away from the outer region 205 toward the opening 102 and partially covers the outer edges of the opening 102. FIG. 4 also shows the cover plate 112 aligned with the mounting plate 121 prior to being attached to the mounting plate 121. The cover plate 112 may be moved upward into engagement with the mounting plate 121 to provide for a flush mounting.

Before the cover plate 112 is attached to the mounting plate 121, the cover plate 112 may be attached over the front of the electrical apparatus 116, and the electrical apparatus 116 with the cover plate 112 attached thereto may then be attached to the mounting plate 121 as shown in FIG. 5. The electrical apparatus 116 may be inserted through the opening 102 in the wall 100 and be positioned on a back side of the mounting plate 121. The outer edge portions of the back side of the cover plate 112 rest against the front side of the mounting plate 121 near a perimeter of the opening 102. Cover plate 112 may be secured to mounting plate 121 as described above, and attachment structures 122(1) and 122(2) (e.g., pins, screws, bolts, or other attachment structures) may be inserted through mounting plate 121 and into wall 100 to secure the mounting plate 121 to the wall 100.

After mounting the flush mountable electrical apparatus 108 onto the wall 100, mudding tape and mudding material 410 may be applied overlapping the perimeter edges of the flush mounting system 120 and the outer surface of the wall 100. This allows the apparatus 108 to be concealed on the same plane as the finished wall surface. A surface coverage, such as paint, may be applied across both the front surface of the flush mounting system 120 and the surrounding wall area at the same time.

After installation, the front surface of the flush mountable electrical apparatus 108 is flush or nearly flush with the outer finished surface of the wall 100. After installation, the electrical apparatus 116 is positioned completely behind the outer surface of the wall 100, and the flush mounting system 120 is the only external part of the installed apparatus 108. After installation, the electrical apparatus 116 is concealed behind the flush-mounted cover plate 112.

Figure 6:
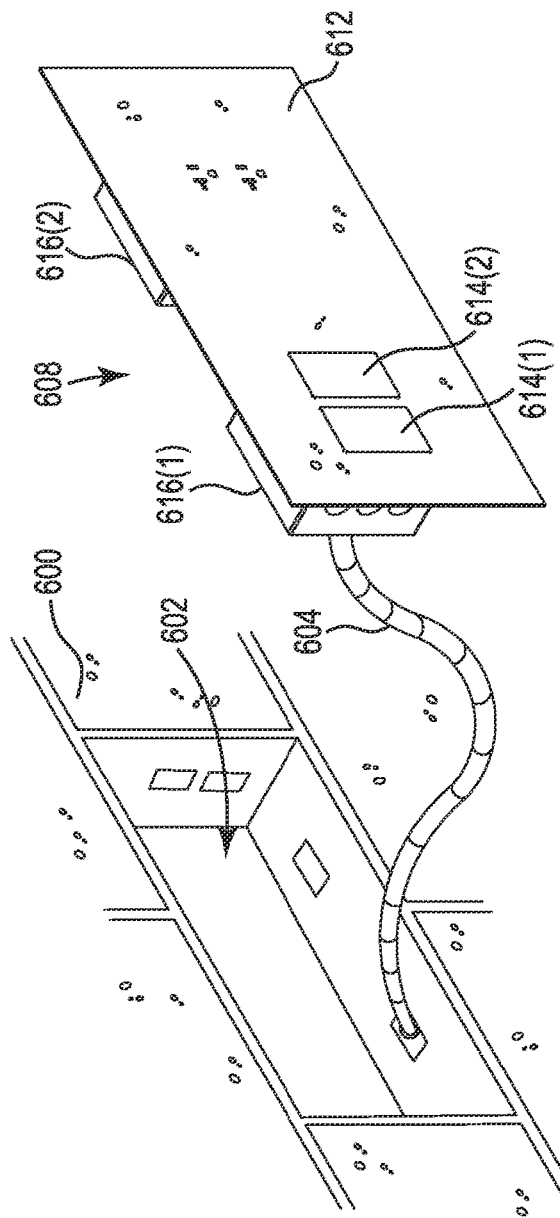
FIG. 6 is a diagram illustrating a flush mountable electrical apparatus configured to be flush mounted to a concrete block wall according to an example.

FIG. 6 is a diagram illustrating a flush mountable electrical apparatus 608 configured to be flush mounted to a concrete block wall 600 according to an example. Flush mountable electrical apparatus 608 includes electrical apparatuses 616(1) and 616(2), and cover plate 612. The electrical apparatuses 616(1) and 616(2) extend outward from a rear surface of the cover plate 612 and may be connected to power cable 604. Power cable 604 provides power from an external source (e.g., the building mains) to at least one electrical device within each of the electrical apparatuses 616(1) and 616(2). The electrical apparatuses 616(1) and 616(2) may include an emergency power supply to provide power when power is lost to the building mains.

Each of the electrical apparatuses 616(1) and 616(2) includes at least one electrical device. In the illustrated example, the electrical apparatus 616(1) includes two electrical devices 614(1) and 614(2) (collectively referred to herein as electrical devices 614). The electrical devices 614 may include any of the electrical devices described herein or other electrical devices.

Flush mountable electrical apparatus 608 is configured to be installed in concrete block wall 600. Wall 600 includes a rectangular-shaped opening 602, which is sized to receive apparatus 608 therein. The front face of the cover plate 612 has the same size and shape as the front face of each of the concrete blocks in the wall 600. The apparatus 608 is configured to be mounted flush with the surface of the concrete block wall 600. The apparatus 608 is positioned within the opening 602 of the concrete block wall 600 with the front surface of the cover plate 612 positioned in the same plane as the front surface of the surrounding wall 600. The front surface of the cover plate 612 may be textured and painted to match the surrounding concrete block wall 600.

Figure 7:
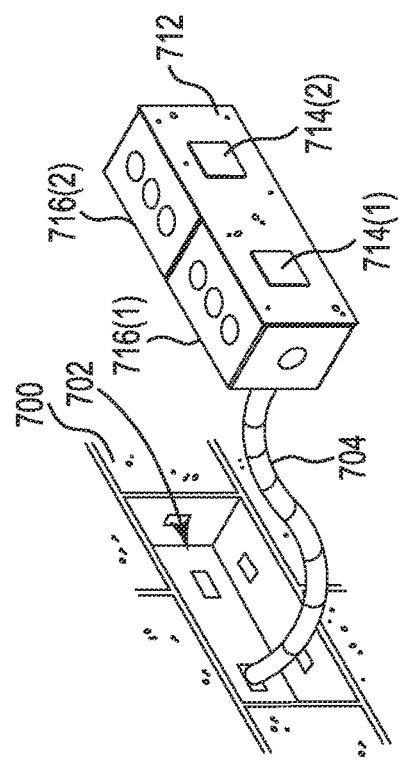
FIG. 7 is a diagram illustrating a flush mountable electrical apparatus configured to be flush mounted to a brick wall according to an example.

FIG. 7 is a diagram illustrating a flush mountable electrical apparatus 708 configured to be flush mounted to a brick wall 700 according to an example. Flush mountable electrical apparatus 708 includes electrical apparatuses 716(1) and 716(2), and cover plate 712. The electrical apparatuses 716(1) and 716(2) extend outward from a rear surface of the cover plate 712 and may be connected to power cable 704. Power cable 704 provides power from an external source (e.g., the building mains) to at least one electrical device within each of the electrical apparatuses 716(1) and 716(2). The electrical apparatuses 716(1) and 716(2) may include an emergency power supply to provide power when power is lost to the building mains.

Each of the electrical apparatuses 716(1) and 716(2) includes at least one electrical device. In the illustrated example, the electrical apparatus 716(1) includes one electrical device 714(1), and the electrical apparatus 716(2) includes one electrical device 714(2). The electrical devices 714(1) and 714(2) may include any of the electrical devices described herein or other electrical devices.

Flush mountable electrical apparatus 708 is configured to be installed in brick wall 700. Wall 700 includes a rectangular-shaped opening 702, which is sized to receive apparatus 708 therein. The front face of the cover plate 712 has the same size and shape as the front face of each of the bricks in the wall 700. The apparatus 708 is configured to be mounted flush with the surface of the brick wall 700. The apparatus 708 is positioned within the opening 702 of the brick wall 700 with the front surface of the cover plate 712 positioned in the same plane as the front surface of the surrounding wall 700. The front surface of the cover plate 712 may be textured and painted to match the surrounding brick wall 700.

Figure 8:
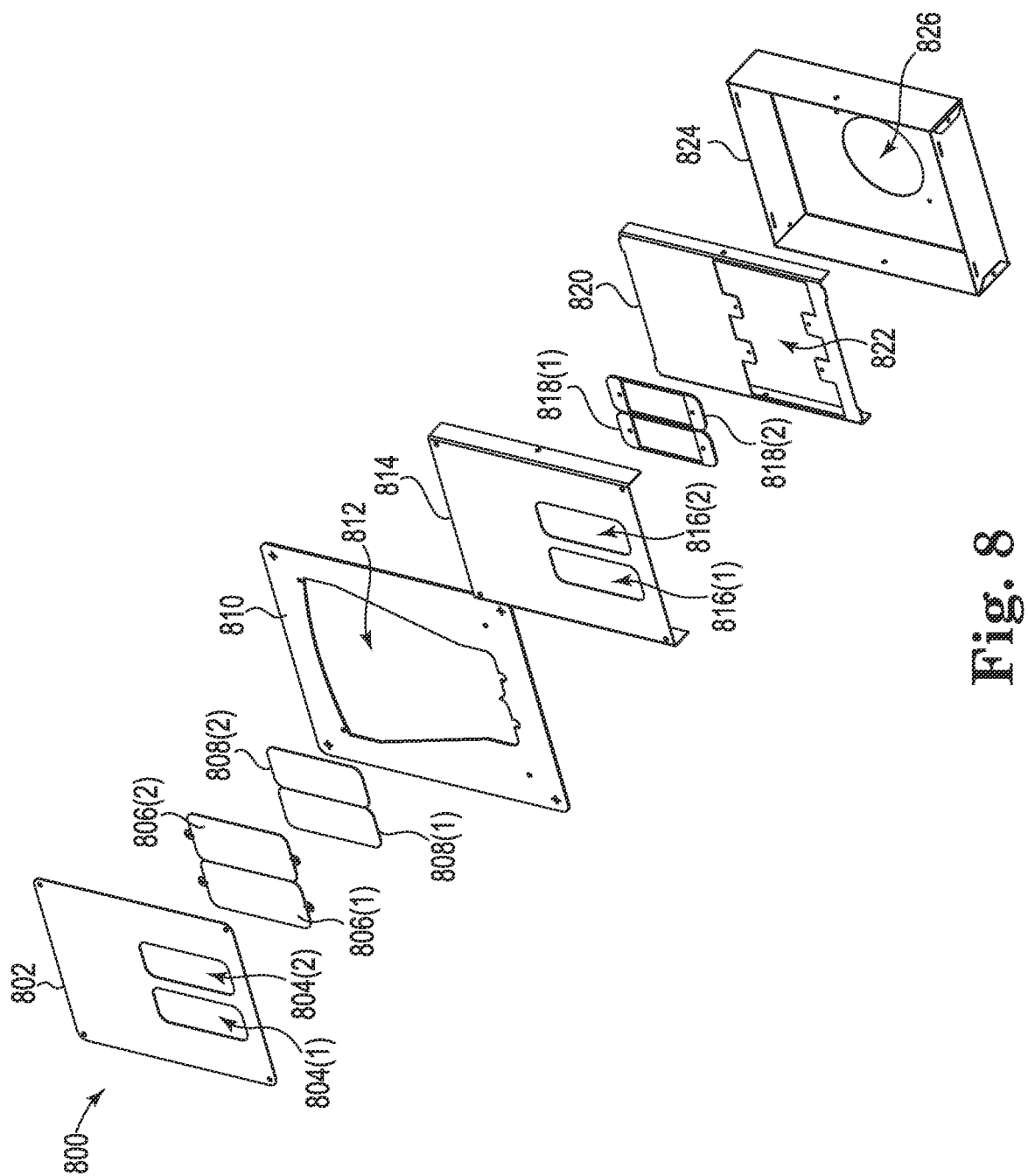
FIG. 8 is an assembly diagram illustrating elements of a flush mounting system according to another example.
Figure 9:
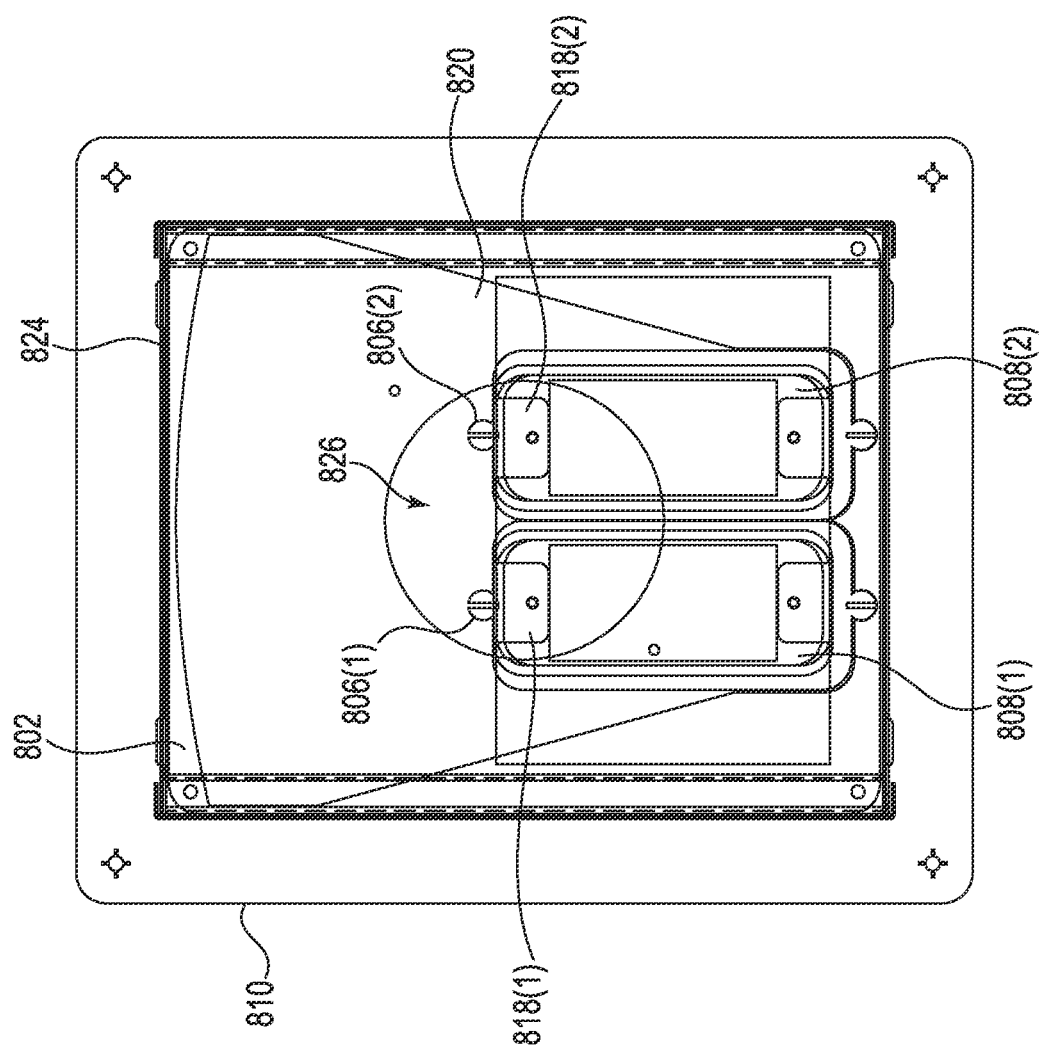
FIG. 9 is a stacked assembly diagram illustrating the flush mounting system shown in FIG. 8 according to an example.

FIG. 8 is an assembly diagram illustrating elements of a flush mounting system 800 according to another example. FIG. 9 is a stacked assembly diagram illustrating the flush mounting system 800 shown in FIG. 8 according to an example. The flush mounting system 800 may be used to flush mount an electrical apparatus to a wall. The electrical apparatus may include a junction box and at least one electrical device. In the illustrated example, the flush mounting system 800 is configured to mount an electrical apparatus having two electrical devices (e.g., two electrical switches). The junction box may include an open end to receive the electrical devices. After the electrical devices are positioned within the junction box, the open end of the junction box may be attached over a back side of the back box 824. An opening 826 in the back side of the back box 824 allows the electrical devices to extend at least partially there through.

The front side of the back box 824 is open, allowing a back box device cover plate 820 to be inserted into this open end of the back box 824. After the back box device cover plate 820 is inserted into the back box 824, the electrical devices of the electrical apparatus are secured to the back box cover plate 820. In the illustrated example, the back box device cover plate 820 includes an opening 822 that allows the two electrical devices to extend at least partially there through. The two electrical devices may be at least partially covered with electrical device cover plates 818(1) and 818(2), which may be mounted to a front side of the back box device cover plate 820.

After the back box device cover plate 820 and electrical device cover plates 818(1) and 818(2) are secured in place, back box cover plate 814 may be attached over the open front end of the back box 824. Back box cover plate 814 includes openings 816(1) and 816(2) to provide access to the electrical devices. The electrical apparatus with the back box 824 attached thereto may then be attached to the mounting plate 810. Mounting plate 810 includes an opening 812. The front side of the back box cover plate 814 is secured against the back side of the mounting plate 810.

In some examples, a front cover plate 802 may be attached over a front side of mounting plate 810. The front cover plate 802 includes openings 804(1) and 804(2), which may be covered with plastic panels 806(1) and 806(2) and 808(1) and 802(2) to define user-interaction regions. The user-interaction regions correspond in size to the openings 804(1) and 804(2) of the front cover plate 802, and are aligned with the electrical devices. A user may push on the user-interaction regions to interact with the electrical devices. In this manner, a user may activate or deactivate one or both of the electrical devices. For example, if the electrical devices are building system control on/off switches concealed behind the front cover plate 802, a user may depress the user-interaction regions to apply pressure to the on/off switches and energize and de-energize building power circuits.

Figure 10:
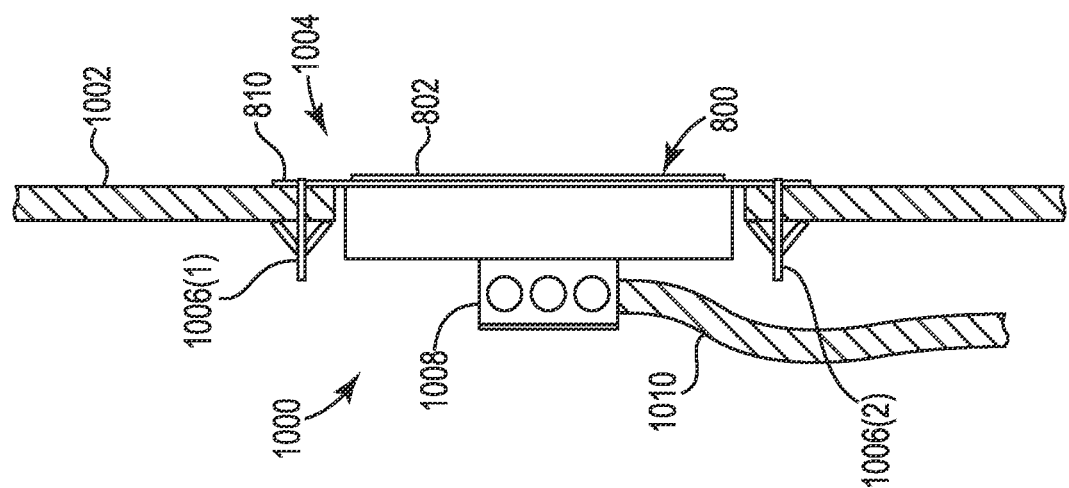
FIG. 10 is a diagram illustrating a side view of a wall and a flush mountable electrical apparatus mounted to the wall according to an example.

At this point, the assembled apparatus may then be mounted to a wall as shown in FIG. 10. FIG. 10 is a diagram illustrating a side view of a wall 1002 and a flush mountable electrical apparatus 1000 mounted to the wall 1002 according to an example. The flush mountable electrical apparatus 1000 includes electrical apparatus 1008 and flush mounting system 800. The electrical apparatus 1008 extends outward from a rear surface of the flush mounting system 800 and is connected to power cable 1010. Power cable 1010 provides power from an external source (e.g., the building mains) to at least one electrical device within the electrical apparatus 1008. The electrical apparatus 1008 may include an emergency power supply to provide power when power is lost to the building mains. The electrical apparatus 1008 includes at least one electrical device.

Wall 1002 includes a rectangular-shaped opening 1004, which is sized to receive electrical apparatus 1008 and back box 824 therein. The flush mounting system 800 includes back box 824, mounting plate 810, and front cover plate 802. The mounting plate 810 includes an outer region that surrounds the opening 812 of the mounting plate 810. The outer region of the mounting plate 810 is attached to a front side of the wall 1002 using attachment structures 1006(1) and 1006(2) (e.g., pins, screws, bolts, or other attachment structures). The front cover plate 802 is secured over a front surface of the mounting plate 810. The back box 824 is secured over a back surface of the mounting plate 810. The electrical apparatus 1008 is secured over a back surface of the back box 824.

After mounting the flush mountable electrical apparatus 1000 onto the wall 1002, mudding tape and mudding material may be applied overlapping the perimeter edges of the flush mounting system 800 and the outer surface of the wall 1002. This allows the apparatus 1000 to be concealed on the same plane as the finished wall surface. A surface coverage, such as paint, may be applied across both the front surface of the flush mounting system 800 and the surrounding wall area at the same time.

After installation, the front surface of the flush mountable electrical apparatus 1000 is flush or nearly flush with the outer finished surface of the wall 1002. After installation, the electrical apparatus 1008 is positioned completely behind the outer surface of the wall 1002, and the flush mounting system 800 is the only external part of the installed apparatus 1000. After installation, the electrical apparatus 1008 is concealed behind the flush-mounted front cover plate 802.

Figure 11:
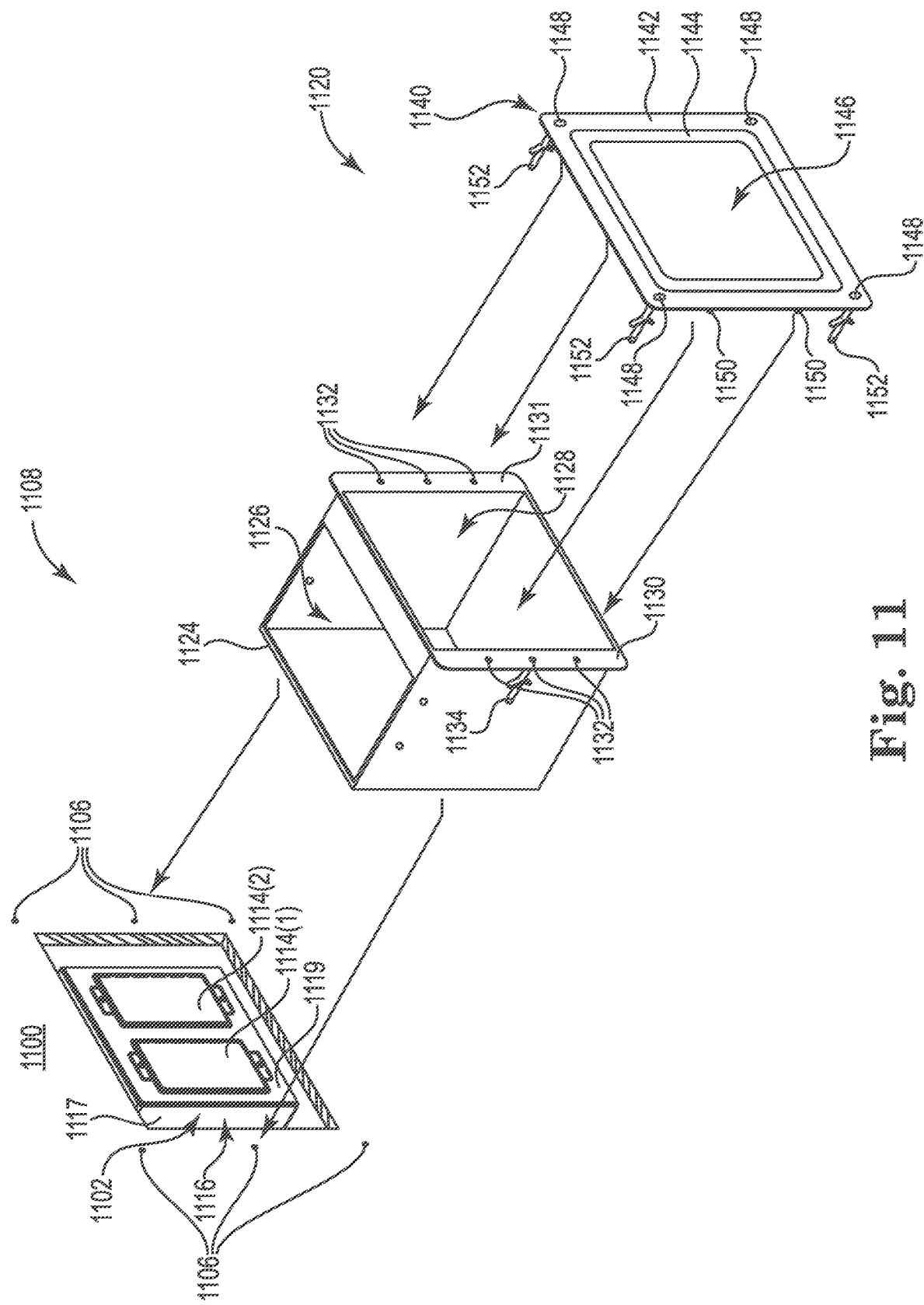
FIG. 11 is an assembly diagram illustrating elements of a flush mountable electrical apparatus according to another example.

FIG. 11 is an assembly diagram illustrating elements of a flush mountable electrical apparatus 1108 according to another example. Flush mountable electrical apparatus 1108 includes electrical apparatus 1116 and flush mounting system 1120. The electrical apparatus 1116 includes a junction box 1117, electrical devices 1114(1) and 1114(2) (collectively referred to herein as electrical devices 1114), and a device cover plate 1119. The electrical devices 1114 may include, for example, control switches, electrical power receptacles, or other electrical devices. Such devices, when used in building construction, are commonly exposed on wall and ceiling mounted installations.

Flush mounting system 1120 includes receiving box 1124 and flush front panel 1140. The top side of the receiving box 1124 includes an opening 1126 that is sized to receive the electrical apparatus 1116 there through so that the electrical apparatus 1116 may be positioned entirely within the interior of the receiving box 1124. Flush mountable electrical apparatus 1108 is configured to be installed in wall 1100. Wall 1100 includes a rectangular-shaped opening or recess 1102, which is sized to receive receiving box 1124 therein. In an example, the electrical apparatus 1116 is movable upward and downward behind the wall 1100 via a transport mechanism to allow the electrical apparatus 1116 to be lowered into the receiving box 1124 through the opening 1126 to position the apparatus 1116 for normal operation. The transport mechanism may also raise the electrical apparatus 1116 upward and out of the receiving box 1124 to a retracted position for maintenance, repair, or other reasons.

Receiving box 1124 includes an opening 1128 on a front side of the box 1124. Receiving box 1124 includes a flange 1130 on a left end of the front side of the box 1124, which extends outward from the front side of the box 1124 perpendicularly to the surface of the left side of the box 1124. Receiving box 1124 includes a flange 1131 on a right end of the front side of the box 1124, which extends outward from the front side of the box 1124 perpendicularly to the surface of the right side of the box 1124. Flanges 1130 and 1131 include holes 1132 formed therein. Wall 100 also includes holes 1106 formed therein around a perimeter of the opening 1102. Two attachment structures 1134 (e.g., pins, screws, bolts, or other attachment structures) are configured to be respectively inserted into two of the holes 1132 (e.g., one hole 1132 in flange 1130 and one hole 1132 in flange 1131) and two of the holes 1106 in the wall 1100 to help maintain the installed positioned of the receiving box 1106 inside the opening 1102. After installation, the rear surfaces of the flanges 1130 and 1131 rest against the outer surface of the wall 1100 adjacent the left and right ends, respectively, of the opening 1102, and the front surfaces of the flanges 1130 and 1131 are flush or nearly flush with the outer finished surface of the wall 1100.

Flush front panel 1140 includes mud plate 1142 and front plate 1144. Front plate 1144 includes a flexible panel 1146. Flush front plate 1140 is configured to be secured to receiving box 1124 and wall 1100. Mud plate 1142 includes four pins 1150 (e.g., pem pins) that extend from a rear surface of the mud plate 1142. The four pins 1150 are sized to be respectively inserted into four of the holes 1132 in the flanges 1130 and 1131 (e.g., two holes 1132 in flange 1130 and two holes 1132 in flange 1131) to help secure the flush front panel 1140 to the receiving box 1124. Mud plate 1142 also includes four holes 1148 formed therein near the four corners of the mud plate 1142. Four attachment structures 1152 (e.g., pins, screws, bolts, or other attachment structures) are configured to be respectively inserted into the four holes 1148 and four of the holes 1106 in the wall 1100 to secure the flush front panel 1140 and the receiving box 1124 to the wall 1100.

After installation, the front surface of the flush mountable electrical apparatus 1108 is flush or nearly flush with the outer finished surface of the wall 1100. After installation, the electrical apparatus 1116 is positioned completely behind the outer surface of the wall 1100, and the flush front panel 1140 is the only external part of the installed apparatus 1108. After installation, the electrical apparatus 1116 is concealed behind the flush front panel 1140, which may be "in-the-field" painted to match each particular room's wall and ceiling finishes.

Flush mountable electrical apparatus 1108 may be mounted into any of many wall materials. In addition to gypsum board, other wall materials where the apparatus 1108 may be installed include brick and mortar, wood, concrete, fiberglass, and metal construction. Matching wall finishes may be applied to the wall and the flush front panel 1140, including paint and wall paper fabric coverage. The front surface of the apparatus 1108 may include a textured finished surface to match any other finished wall materials.

After mounting the flush mountable electrical apparatus 1108 onto the wall 1100, standard mudding of plaster compound and fiberglass taping may be applied overlapping the perimeter edges of the flush front panel 1140 and the wall surface. This allows the apparatus 1108 to be concealed on the same plane as the finished wall surface. A surface coverage, such as paint, may be applied across both the perimeter of the front surface of the flush front panel 1140 and the surrounding wall area at the same time. The flush front panel 1140 allows the application thereon of the same matching overall wall finished colors to blend this panel 1140 into each unique room finished wall or ceiling appearance. After installation, the flush mountable electrical apparatus 1108 has an aesthetically pleasing appearance in regard to the desire of architects and interior designers because it is substantially concealed and blends in with the surrounding wall surface. The flush mountable electrical apparatus 1108 has the ability to provide the best appearance regardless of the particular wall construction materials and textures, including gypsum board, wood, concrete block, brick, stone, marble, and others.

Portions of the flush front panel 1140 may also be manufactured with any appearance and texture, to match exactly a wall or ceiling finished material appearance with the use of a laser printed paint application. Laser printing applications include replicating any paint color selection, typically specified under RAL, Pantone or similar color number matching charts. The laser printed flush cover front panel can also replicate the exact surrounding wall materials and textures and match wood grain, marble lines and metallic finishes, brick, concrete, and concrete block. Textured metal or silicone mold versions of the front panel 1140 may be made to match the surrounding wall material finishes. The flush front panel 1140 can be manufactured as a translucent panel with internally illuminated back lighted switches to indicate on/off positions and also feature illuminated custom logos/patterns.

Previous exposed electrical apparatuses in buildings could experience very high ongoing replacement costs to building owners. Exposed electrical apparatuses are typically an easy target for vandalism since the enclosures are noticeably visible and may be constructed with component parts that suffer damage easily. Damaged electrical apparatuses can also cause added liability and safety concerns. In contrast, examples of the flush mountable electrical apparatus 1108 conceal electrical devices and their associated cover plates and provide reduced liability concerns and an improvement in regard to vandalism with the concealed enclosure. This design reduces possible damage from vandalism since there is no visible exposed enclosure or constructed parts to attract undesirable attention.

In addition, to improving the aesthetics of the buildings room areas, examples of the flush mountable electrical apparatus 1108 also improve the hygiene of the space. Switches and receptacle devices are especially subject to be a collection point for germs, bacteria, and viruses. Some switch designs require many hours of work to maintain the cleanliness of the exposed switches and cover plates. Cleanliness is especially important in all medical facilities, clean rooms, and laboratories. Examples of the flush mountable electrical apparatus 1108 help to improve the cleanliness level by allowing for a simple spraying and wiping of the entire wall surfaces as is typically done regularly, which includes the switch (or other electrical device) areas too. The actual electrical device locations can be identified with contrasting wall colors, perimeter embossed outlines and textures so that the user can quickly locate and operate the electrical devices.

FIG. 12 is an assembly diagram illustrating elements of the flush front panel 1140 shown in FIG. 11 according to an example. As shown in FIG. 12, the mud plate 1142 includes two openings 1202(1) and 1202(2), which, after installation, are respectively aligned with the two electrical devices 1114(1) and 1114(2) (FIG. 11). Front plate 1144 is configured to be secured over a front surface of the mud plate 1142 via, for example, spot welding. After the front plate 1144 is secured to the mud plate 1142, the flexible panel 1146 covers the openings 1202(1) and 1202(2) of the mud plate 1142. A user may push on the flexible panel 1146, causing the flexible material to extend into the openings 1202(1) and 1202(2).

FIG. 13 is a diagram illustrating a back side of the flush front panel 1140 shown in FIGS. 11 and 12 according to an example. As shown in FIG. 13, the flush front panel 1140 includes two spring steel switch transfer bars 1302(1) and 1302(2) (collectively referred to as transfer bars 1302) mounted on a back side of the mud plate 1142. The transfer bars 1302(1) and 1302(2) extend vertically across the openings 1202(1) and 1202(2), respectively, in the mud plate 1142.

When a user pushes on a front side of the flexible panel 1146, the flexible material of the panel 1146 extends into the opening 1202(1) or 1202(2) and pushes against the transfer bar 1302(1) or 1302(2) aligned with that opening. This force against the transfer bar 1302(1) and 1302(2) causes the transfer bar 1302(1) and 1302(2) to contact its corresponding electrical device 1114(1) or 1114(2) (FIG. 11). In this manner, a user may activate or deactivate one or both of the electrical devices 1114(1) and 1114(2). For example, if electrical devices 1114(1) and 1114(2) are building system control on/off pushbutton switches concealed behind the flush front panel 1140, a user may depress the flexible panel 1146 to apply pressure to the on/off switches and energize and de-energize building power circuits. Thus, the actual contact surface of the completely concealed electrical devices 1114(1) and 1114(2) is accomplished by using the flexible panel 1146, which the user depresses at the wall plane where the devices 1114(1) and 1114(2) are located.

For some types of electrical devices, such as some capacitance switches, resistive switches, proximity switches, infrared switches, and laser beam switches, actual physical contact with the flexible panel 1146 (or other panel if flexible panel 1146 is not used) by a user to cause physical movement of the flexible material may not be required to control the electrical devices. Rather, for such electrical devices, a user may be able to control the electrical devices by, for example, simply making contact with the flexible panel 1146, or moving the user's hand in proximity to the flexible panel 1146 to be sensed by a switch sensor. Thus, in some examples in which the devices 1114(1) and 1114(2) are switches, a user may operate the switches for on, off, dimming, etc., by just making contact with a portion of the wall that is defined by the flexible panel 1146. The movement necessary to actuate the recessed wall switches is so minute that even a painted over wall material would not deteriorate from many operations, and in some examples, the recessed wall switches may be controlled without making any physical contact with the flexible panel 1146.

The shape and construction of the transfer bars 1302(1) and 1302(2) may vary based on the type of the electrical devices 1114(1) and 1114(2) being used. FIG. 14 is a diagram illustrating a spring steel switch transfer bar 1402 according to another example. Two of the transfer bars 1402 may be used in place of the transfer bars 1302(1) and 1302(2) (FIG. 13) if the electrical devices 1114(1) and 1114(2) include, for example, up/down toggle switches.

FIG. 15 is a diagram illustrating a front view of a transport mechanism 1516 for the flush mountable electrical apparatus 1108 shown in FIG. 11 according to an example. As shown in FIG. 15, the receiving box 1124 of the apparatus 1108 is mounted in the wall 1500 next to a door 1502. A suspended ceiling 1506 is positioned above the door 1502, and a structural ceiling 1510 is positioned above the suspended ceiling 1506. The space between the suspended ceiling 1506 and the structural ceiling 1510 is an above ceiling access space 1508.

In an example, the transport mechanism 1516 is a worm gear drive mechanism that includes motor 1512, threaded shaft 1514, and raceway 1518. In other examples, transport mechanism 1516 may be another type of mechanism, such as a cable-based mechanism, a chain drive mechanism, a flexible push rod mechanism, or a powered motorized track mechanism. Raceway 1518 is positioned behind the wall 1500, and extends from the location of the receiving box 1124 to above the suspended ceiling 1506.

Electrical apparatus 1116 is movably coupled to the threaded shaft 1514, with movement indicated by arrow 1504. Motor 1512 is coupled to the threaded shaft 1514 and causes rotation of the threaded shaft 1514. Rotation of the shaft 1514 in a first direction (e.g., clockwise) causes vertical movement of the electrical apparatus 1116 along the shaft 1514 and through the raceway 1518 in a first direction (e.g., upward), and rotation of the shaft 1514 in a second direction (e.g., counterclockwise) causes vertical movement of the electrical apparatus 1116 along the shaft 1514 and through the raceway 1518 in a second direction (e.g., downward). In this manner, transport mechanism 1516 may be used to move the electrical apparatus 1116 from the retracted position in which the electrical apparatus 1116 is positioned within a sending box 1520 above the suspended ceiling 1506 as shown in FIG. 15, to an installed position in which the electrical apparatus 1116 is positioned within the receiving box 1124. In other examples, the sending box 1520 may be positioned in a different position, such as below the suspended ceiling 1506 within the same room as the receiving box 1124 or a different room. The raceway 1518 may be adjustable in length with extensions to fit various distances between the installed position of an electrical apparatus 1116 and a ceiling.

Transport mechanism 1516 may also be used to move the electrical apparatus 1116 from the installed position to the retracted position. Moving the electrical apparatus 1116 to the retracted position allows user access to electrical devices 1114(1) and 1114(2), and related branch circuiting and terminations, from above the suspended ceiling 1506. The electrical devices 1114(1) and 1114(2) may be wall switches positioned by the door 1502 as shown in FIG. 15, or another type of electrical device, such as power outlets positioned closer to the floor. The circuitry associated with the electrical devices 1114(1) and 1114(2) may include hard wiring, wireless radio frequency (RF) circuitry, WiFi circuitry, Bluetooth circuitry, and/or other circuitry.

Figure 16:
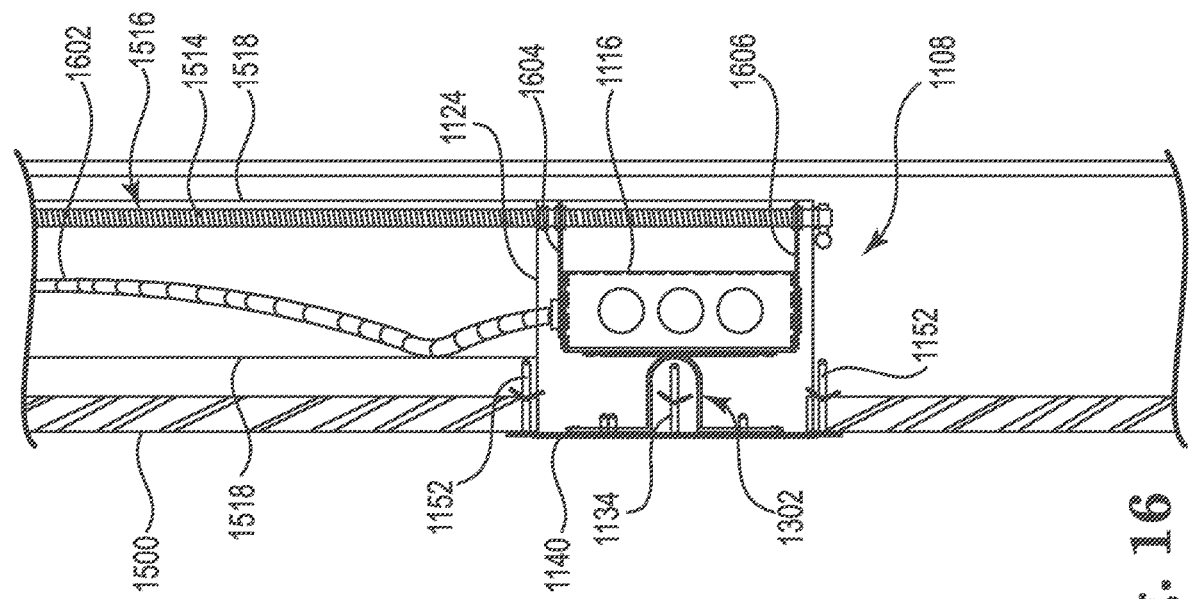
FIG. 16 is a diagram illustrating a side view of the transport mechanism and the electrical apparatus shown in FIG. 15 according to an example.

FIG. 16 is a diagram illustrating a side view of the transport mechanism 1516 and the electrical apparatus 1116 shown in FIG. 15 according to an example. As shown in FIG. 16, the electrical apparatus 1116 is positioned in the installed position within the receiving box 1124. In the installed position, the front surface of the flush front panel 1140 is flush or nearly flush with the outer finished surface of the wall 1500. In the installed position, the electrical apparatus 1116 is positioned completely behind the outer surface of the wall 1500, and the flush front panel 1140 is the only external part of the installed apparatus 1108. Raceway 1518 is positioned behind the wall 1500, and extends from the location of the receiving box 1124 to above the suspended ceiling 1506 (FIG. 15). Electrical apparatus 1116 is movably coupled to the threaded shaft 1514 via coupling structures 1604 and 1606. Electrical apparatus 1116 is connected to power cable 1602, which provides power from an external source (e.g., the building mains) to at least one electrical device within the electrical apparatus 1116. The power cable 1602 extends upward from the electrical apparatus 1116 into the raceway 1518.

FIG. 17 is a diagram illustrating a front view of the transport mechanism 1516 and the electrical apparatus 1116 shown in FIG. 15 according to another example. As shown in FIG. 17, the electrical apparatus 1116 is positioned in the retracted position within the sending box 1520, which is positioned above the suspended ceiling 1506 (FIG. 15) and below the structural ceiling 1510. The sending box 1520 includes an opening in the bottom side of the box 1520 that is sized to receive the electrical apparatus 1116. The sending box 1520 also includes an open front side that faces an opening 1708 in the wall 1500, which allows a user to access the electrical apparatus 1116. The power cable 1602 may also extend through these openings. Power may be applied to the motor 1512 to cause the motor 1512 to independently drive the threaded shaft 1514, or an external power tool, such as a torque wrench or screwdriver, may be applied to the motor 1512 to cause the motor 1512 to drive the threaded shaft 1514. A two way torque limiter 1706 may be coupled to the threaded shaft 1514 to protect against mechanical overload.

One example of the present disclosure is directed to a flush mountable electrical apparatus, which includes an electrical apparatus including a junction box having an open end, an electrical device positioned within the junction box, and a first cover plate to cover the open end of the junction box. The flush mountable electrical apparatus further includes a second cover plate attached to the first cover plate, and a mounting plate to be mounted over a recess in a mounting surface. The mounting plate includes a first opening sized to allow the electrical apparatus to be inserted through the first opening and into the recess. The second cover plate is configured to be attached to the mounting plate to secure the electrical apparatus in position within the recess.

In some examples, the second cover plate and the mounting plate may be configured to be mounted substantially flush with the mounting surface. The second cover plate and the mounting plate may be field paintable to match a finish of the mounting surface. The second cover plate may be textured to match a texture of the mounting surface. The second cover plate may have a laser printed finish that matches a finish of the mounting surface. The second cover plate may include an opening aligned with an opening of the first cover plate to allow access to the electrical device. The second cover plate may be larger than the first cover plate and may be larger than the first opening of the mounting plate. The mounting plate may include an inner region directly adjacent to and surrounding the first opening, and an outer region directly adjacent to and surrounding the inner region, wherein outer edge regions of the second cover plate are configured to be mounted to the inner region of the mounting plate. The outer region of the mounting plate may be configured to be mounted to the mounting surface.

The flush mountable electrical apparatus may further include a flexible cover plate attached over the second cover plate. The flexible cover plate may include a user-interaction region aligned with an opening in the first cover plate and an opening in the second cover plate to allow a user to interact with the electrical device. The electrical apparatus may include a plurality of electrical devices positioned in the junction box, and the first cover plate may include a plurality of openings to provide access to the plurality of electrical devices. The second cover plate may include a plurality of openings respectively aligned with the plurality of openings of the first cover plate.

Another example of the present disclosure is directed to a flush mounting system for mounting an electrical apparatus including a junction box within a recess in a wall. The flush mounting system includes a mounting system box having a back side to be attached to the junction box, and a mounting plate to be mounted over the recess. The mounting system box is configured to be secured to a back side of the mounting plate to secure the electrical apparatus and the mounting system box in position within the recess.

The flush mounting system may include a mounting system front cover plate to be attached over a front side of the mounting plate. The mounting system front cover plate and the mounting plate may be configured to be mounted substantially flush with the wall. The back side of the mounting system box may include an opening to provide access to the junction box. The flush mounting system may further include a box cover plate to cover an open front side of the mounting system box, and the box cover plate may include at least one opening. The mounting plate may include an inner region directly adjacent to and surrounding a first opening in the mounting plate, and an outer region directly adjacent to and surrounding the inner region, wherein outer edge regions of the mounting system front cover plate are configured to be mounted to the inner region of the mounting plate, and wherein the outer region of the mounting plate may be configured to be mounted to the wall.

Another example of the present disclosure is directed to a flush mountable electrical apparatus, which includes an electrical apparatus including a junction box having an open end, an electrical device positioned within the junction box, and a first cover plate to cover the open end of the junction box. The electrical apparatus is sized to fit within a recess in a brick or concrete block wall. The flush mountable electrical apparatus further includes a second cover plate attached to the first cover plate. The second cover plate is configured to be mounted flush with an outer surface of the wall to secure the electrical apparatus within the recess. The second cover plate is sized to cover the recess in the wall, and has a color and texture that matches a color and texture of the wall.

Another example of the present disclosure is directed to an apparatus, which includes an electrical apparatus including a junction box and an electrical device positioned within the junction box. The apparatus includes a receiving box to be mounted in a recess in a mounting surface, wherein the receiving box includes a first opening in a front side of the receiving box. The apparatus includes a transport mechanism to be positioned behind the mounting surface, wherein the transport mechanism is coupled to the electrical apparatus to cause the electrical apparatus to be transported between a retracted position outside of the receiving box and an installed position within the receiving box, wherein the electrical device is accessible through the first opening of the receiving box in the installed position.

The receiving box may include a second opening in another side of the receiving box, wherein the second opening is sized to allow the electrical apparatus to be inserted through the second opening and into the receiving box. The transport mechanism may be configured to transport the electrical apparatus through the second opening and into the receiving box. The apparatus may further include a sending box with an opening sized to allow the electrical to be inserted through the second opening and into the sending box in the retracted position. The transport mechanism may be configured to transport the electrical apparatus through the opening of the sending box and into the sending box. The apparatus may further include a flush front panel to be mounted over the recess flush to the mounting surface. The flush front panel may include a flexible panel aligned with the first opening in the receiving box to allow a user to interact with the electrical device. The transport mechanism may comprise a worm gear drive mechanism.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A flush mountable electrical apparatus, comprising:
an electrical apparatus including a junction box having an open end, an electrical device positioned within the junction box, and a first cover plate to cover the open end of the junction box;
a second cover plate attached to the first cover plate;
a mounting plate to be mounted over a recess in a mounting surface, wherein the mounting plate includes a first opening sized to allow the electrical apparatus to be inserted through the first opening and into the recess, and wherein the second cover plate is configured to be directly attached to the mounting plate to secure the electrical apparatus in position within the recess; and
a flexible cover plate attached over the second cover plate, wherein the flexible cover plate includes a user-interaction region aligned with an opening in the first cover plate and an opening in the second cover plate to allow a user to interact with the electrical device.

2. The flush mountable electrical apparatus of claim 1, wherein the second cover plate and the mounting plate are configured to be mounted substantially flush with the mounting surface.

3. The flush mountable electrical apparatus of claim 1, wherein the second cover plate and the mounting plate are field paintable to match a finish of the mounting surface.

4. The flush mountable electrical apparatus of claim 1, wherein the second cover plate is textured to match a texture of the mounting surface.

5. The flush mountable electrical apparatus of claim 1, wherein the second cover plate has a laser printed finish that matches a finish of the mounting surface.

6. The flush mountable electrical apparatus of claim 1, wherein the second cover plate includes an opening aligned with an opening of the first cover plate to allow access to the electrical device.

7. The flush mountable electrical apparatus of claim 1, wherein the second cover plate is larger than the first cover plate and is larger than the first opening of the mounting plate.

8. The flush mountable electrical apparatus of claim 7, wherein the mounting plate includes an inner region directly adjacent to and surrounding the first opening, and an outer region directly adjacent to and surrounding the inner region, wherein outer edge regions of the second cover plate are configured to be mounted to the inner region of the mounting plate.

9. The flush mountable electrical apparatus of claim 8, wherein the outer region of the mounting plate is configured to be mounted to the mounting surface.

10. The flush mountable electrical apparatus of claim 1, wherein the electrical apparatus includes a plurality of electrical devices positioned in the junction box, and wherein the first cover plate includes a plurality of openings to provide access to the plurality of electrical devices.

11. The flush mountable electrical apparatus of claim 10, wherein the second cover plate includes a plurality of openings respectively aligned with the plurality of openings of the first cover plate.

12. A flush mountable electrical apparatus, comprising:
an electrical apparatus including a junction box having an open end, an electrical device positioned within the junction box, and a first cover plate to cover the open end of the junction box;
a second cover plate attached to the first cover plate;
a mounting plate to be mounted over a recess in a mounting surface, wherein the mounting plate includes a first opening sized to allow the electrical apparatus to be inserted through the first opening and into the recess, and wherein the second cover plate is configured to be attached to the mounting plate to secure the electrical apparatus in position within the recess; and
a flexible cover plate attached over the second cover plate, wherein the flexible cover plate includes a user-interaction region aligned with an opening in the first cover plate and an opening in the second cover plate to allow a user to interact with the electrical device.

13. The flush mountable electrical apparatus of claim 12, wherein the second cover plate and the mounting plate are configured to be mounted substantially flush with the mounting surface.

14. The flush mountable electrical apparatus of claim 12, wherein the second cover plate and the mounting plate are field paintable to match a finish of the mounting surface.

15. The flush mountable electrical apparatus of claim 12, wherein the second cover plate is textured to match a texture of the mounting surface.

16. The flush mountable electrical apparatus of claim 12, wherein the second cover plate has a laser printed finish that matches a finish of the mounting surface.

17. The flush mountable electrical apparatus of claim 12, wherein the second cover plate includes an opening aligned with an opening of the first cover plate to allow access to the electrical device.

18. The flush mountable electrical apparatus of claim 12, wherein the second cover plate is larger than the first cover plate and is larger than the first opening of the mounting plate.

19. The flush mountable electrical apparatus of claim 18, wherein the mounting plate includes an inner region directly adjacent to and surrounding the first opening, and an outer region directly adjacent to and surrounding the inner region, wherein outer edge regions of the second cover plate are configured to be mounted to the inner region of the mounting plate.

20. The flush mountable electrical apparatus of claim 19, wherein the outer region of the mounting plate is configured to be mounted to the mounting surface.

* * * * *